(12) United States Patent
O'Connell

(10) Patent No.: US 7,729,199 B2
(45) Date of Patent: Jun. 1, 2010

(54) EXTERNAL BEAM EXPANDER

(75) Inventor: Dan O'Connell, Wailuku, HI (US)

(73) Assignee: HNu-Photonics, Wailuku, HI (US)

(*) Notice: Subject to any disclaimer, the term of this patent is extended or adjusted under 35 U.S.C. 154(b) by 406 days.

(21) Appl. No.: 11/907,193

(22) Filed: Oct. 10, 2007

(65) Prior Publication Data

US 2008/0130007 A1    Jun. 5, 2008

(51) Int. Cl.
    *G11C 13/04*     (2006.01)
(52) U.S. Cl. .......................... 365/234; 365/10; 365/64; 365/237
(58) Field of Classification Search ................. 365/234, 365/10, 64, 237
See application file for complete search history.

(56) References Cited

U.S. PATENT DOCUMENTS

| 4,188,122 | A | | 2/1980 | Massie et al. |
| 5,490,849 | A | * | 2/1996 | Smith ............................ 606/5 |
| 5,561,525 | A | | 10/1996 | Toyonaga et al. |
| 6,965,435 | B2 | | 11/2005 | Ina |

* cited by examiner

*Primary Examiner*—Thong Q Le
(74) *Attorney, Agent, or Firm*—Morgan Lewis & Bockius LLP

(57) ABSTRACT

The invention encompasses beam expanders and methods of using such beam expanders. A beam expander according to the present invention may advantageously be used with an interferometer. Beam expanders according to the present disclosure contain at least an input and an output lens, with the output lens having a plano-convex arrangement such that the surface of the output lens is optically flat and can be used as the reference surface in a Fizeau interferometer. The beam expander may also encompass a housing, a partially reflective coating and an anti-reflective coating.

19 Claims, 4 Drawing Sheets

EXTERNAL BEAM EXPANDER

BACKGROUND OF THE INVENTION

I. Field of the Invention

The present invention relates to interferometry, in particular to an external beam expander for use with an interferometer.

II. Description of Related Art

Interferometry is the use of interference phenomena for measurement purposes, either for very small angles or for tiny distance increments (the displacement of two objects relative to one another). An interferometer is an instrument that measures distance in terms of wavelength; it can be used to determine wavelengths of particular light sources.

Virtually all interferometers operate on the same basic principle: From a beam of light coming from a single source (such as, e.g., a laser), two or more flat mirrors, partially reflective mirrors, or beam splitters are used to split off (or "pick off") different light beams. These beams are then combined to interfere with each other. The desired result is to find alternating bands of light and dark, called fringes. Fringes are bright where the beams are constructively adding together and dark where they are canceling each other out. Based on this interference, measurements can be carried out.

A variety of interferometers are available with different optical configurations, which help to achieve the location of fringes. These configurations include for example, Fizeau, Fabrey-Perot, Michelson, and Twyman-Green. Fizeau interferometers, also known as image-plane interferometers, utilize a reference and test light path of unequal distance. Fabrey-Perot interferometers are frequency-tuning devices that exploit the properties of interference between two adjacent flat, parallel surfaces. Michelson interferometers are constructed using a half-silvered mirror inclined at a 45° angle to the incoming beam. Half the light is reflected perpendicularly and bounces off a beam-splitter; the other half passes through and is reflected by a second beam-splitter. Light passing through the mirror must also pass through an inclined compensator plate. The beam splitter and mirror arrangement of Twyman-Green interferometers resembles that of a Michelson interferometer, but a Twyman-Green interferometer is illuminated differently. While Michelson interferometers use an extended light source, the Twyman-Green interferometers use monochromatic point sources, located at the principal focus of lens.

In general, the reference surface in an interferometer separates the beam into two beams, a test beam, and a reference beam. The two beams of light travel different paths. The test beam leaves the interferometer and interacts with a surface or surfaces under test. In typical commercial applications, the surfaces under test are at succinct stages of a manufacturing process and are uncoated, resulting in a small reflection available to the interferometer for testing.

Large aperture interferometry has many commercial applications. Typically, large-scale interferometry utilizes only a small beam size, greatly limiting the use of this measurement technique. For instance, in many optical applications, such as large deformable mirror testing and large flat mirror testing, large area surface testing requires beam sizes larger than the typically commercially available beam size of 4 inches. Use of an interferometer in such optical applications requires a beam expander, which increases the size of the beam after exiting the interferometer. Existing beam expanders that convert the output of an interferometer, for example from four (4) to twelve (12) inches in diameter, consist of an off-axis mirror configuration that is cumbersome, difficult to align and maintain. Such an arrangement limits the utility of the interferometer in many test environments.

A typical Fizeau interferometer such as disclosed in U.S. Pat. No. 6,965,435 to Ina, has an internal beam expander where the final surface optical is not flat, cannot be, and is not used as a reference surface.

U.S. Pat. No. 5,561,525 to Toyonaga et al. discloses an interferometer with an internal and external beam expander. The external beam expander only expands the light leading to the reference surface, and neither beam expander lens is optically flat to act as a reference surface.

U.S. Pat. No. 4,188,122 to Massie et al. discloses an interferometer, which has two beam expanders. Neither beam expander, however, has a final surface that is flat enough to act as a reference surface.

Thus, there remains a need for a beam expander suitable for large aperture interferometry that is compact and that can be interfaced to existing phase-shifting interferometers.

SUMMARY

The present invention relates to a beam expander, in particular an external beam expander.

One embodiment of the invention is an external beam expander for use with an interferometer, which is made up of at least one input lens, at least one output lens and a rigid housing. The input lens is mounted at one end of the housing and the output lens is mounted at the other end of the housing. Furthermore, the output lens has a plano-convex arrangement such that the surface of the output lens is optically flat and can be used as the reference surface in a Fizeau interferometer. The input lens may be a single lens with one aspheric surface or a doublet lens with spherical radii of curvature. The input lens may have a plano-concave arrangement using one aspheric surface.

The beam expander may be of various dimensions depending on its use. In one embodiment, the input lens and output lens are separated between about 14 and about 28 inches. The input lens can be about 4 inches in diameter and the output lens can be between about 12 and about 16 inches in diameter. When the output lens has diameter of about 12 inches, the radius of curvature may be approximately 24 inches.

The final optical output surface may be optically flat to within an optical path difference of one-tenth of the wavelength of test light.

The plano-convex prescription of the output lens may have a radius of curvature from about 17 inches to about 36 inches.

The input lens and output lens may be made of a variety of materials such as, e.g., fused silica or BK7. The output lens may also have a partially reflective coating. Each optical surface may also be coated with high efficiency anti-reflective coating. The rigid mechanical housing may also be constructed of a variety of materials such as, e.g., invar steel or other low expansion materials.

Another embodiment of the invention is a beam expander that is constructed from at least one input lens, at least one output lens, wherein the output lens has a plano-convex prescription such that the surface of the output lens is optically flat and can be used as the reference surface in a Fizeau interferometer. The input lens may be a single lens with an aspheric surface or a doublet lens with spherical radii of curvature. The single input lens may have one aspheric surface and one plano surface or one aspheric surface and one nearly plano input surface. The surface of the output lens may be optically flat to one-tenth the wavelength of test light (or flatter) and the final surface may be coated with partially reflective coating.

The invention also encompasses methods of using beam expanders. For example, the invention encompasses a method of using a beam expander with a phase-shifting interferometer with the steps of: a) placing a beam expander in line with a phase-shifting interferometer, so that the light exiting the interferometer passes through the beam expander; and b) operating the phase-shifting interferometer with the beam expander.

One embodiment of the invention is a method of using a beam expander with a phase-shifting interferometer with the steps of: a) providing a phase-shifting interferometer; b) providing a beam expander; and c) placing said beam expander in line with the phase shifting interferometer.

Additional features and advantages of the invention will be set forth in the description, which follows, and will be apparent, in part, from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 shows the basic optical layout of a beam expander according to the present invention with a doublet lens at the input.

FIG. 2 shows the basic optical layout of another embodiment of the invention utilizing a single aspheric lens at the input.

FIG. 4 shows the optical path difference with a maximum scale ±0.050 waves using a Helium-Neon laser.

DETAILED DESCRIPTION

Figure 1:
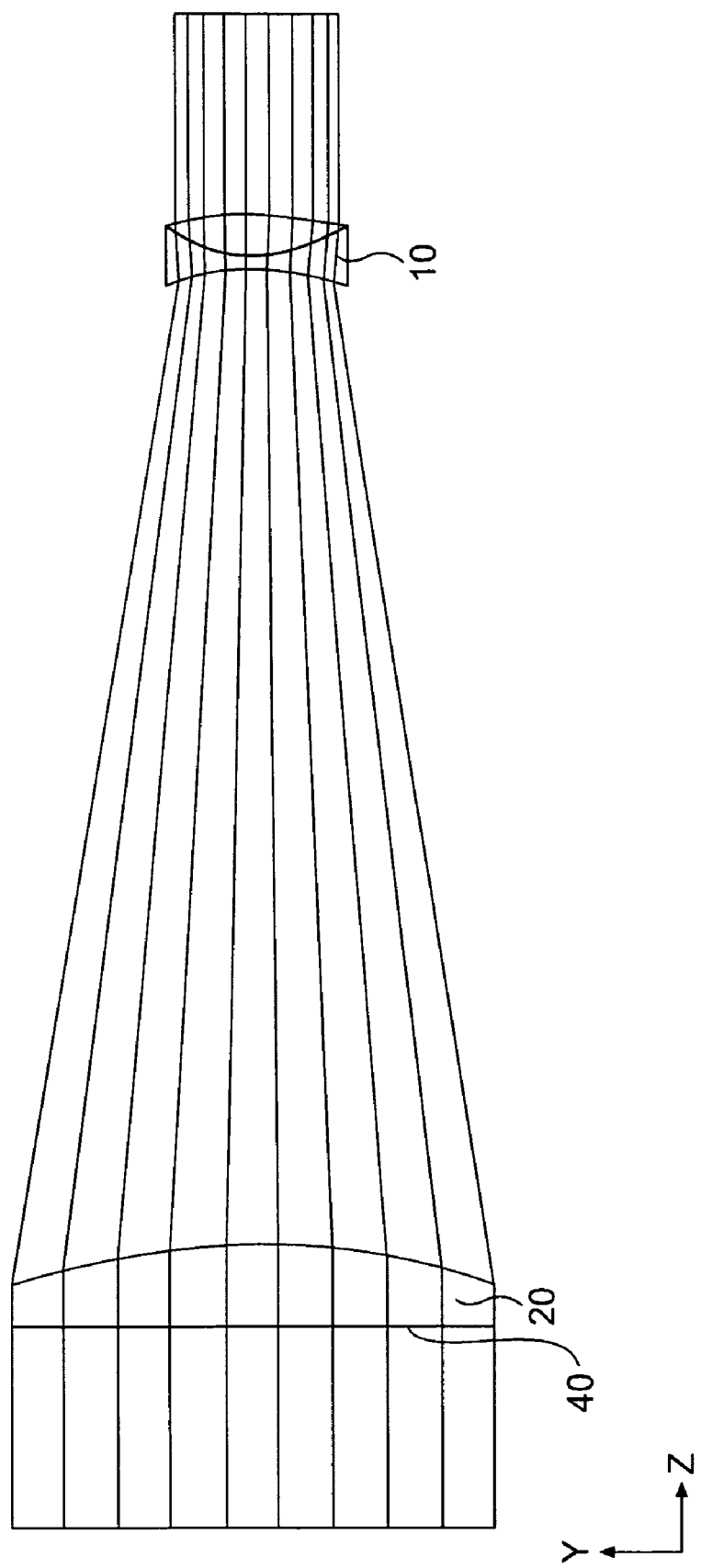
FIG. 1 is a graphical depiction of a beam expander apparatus according to the present invention.
Figure 2:
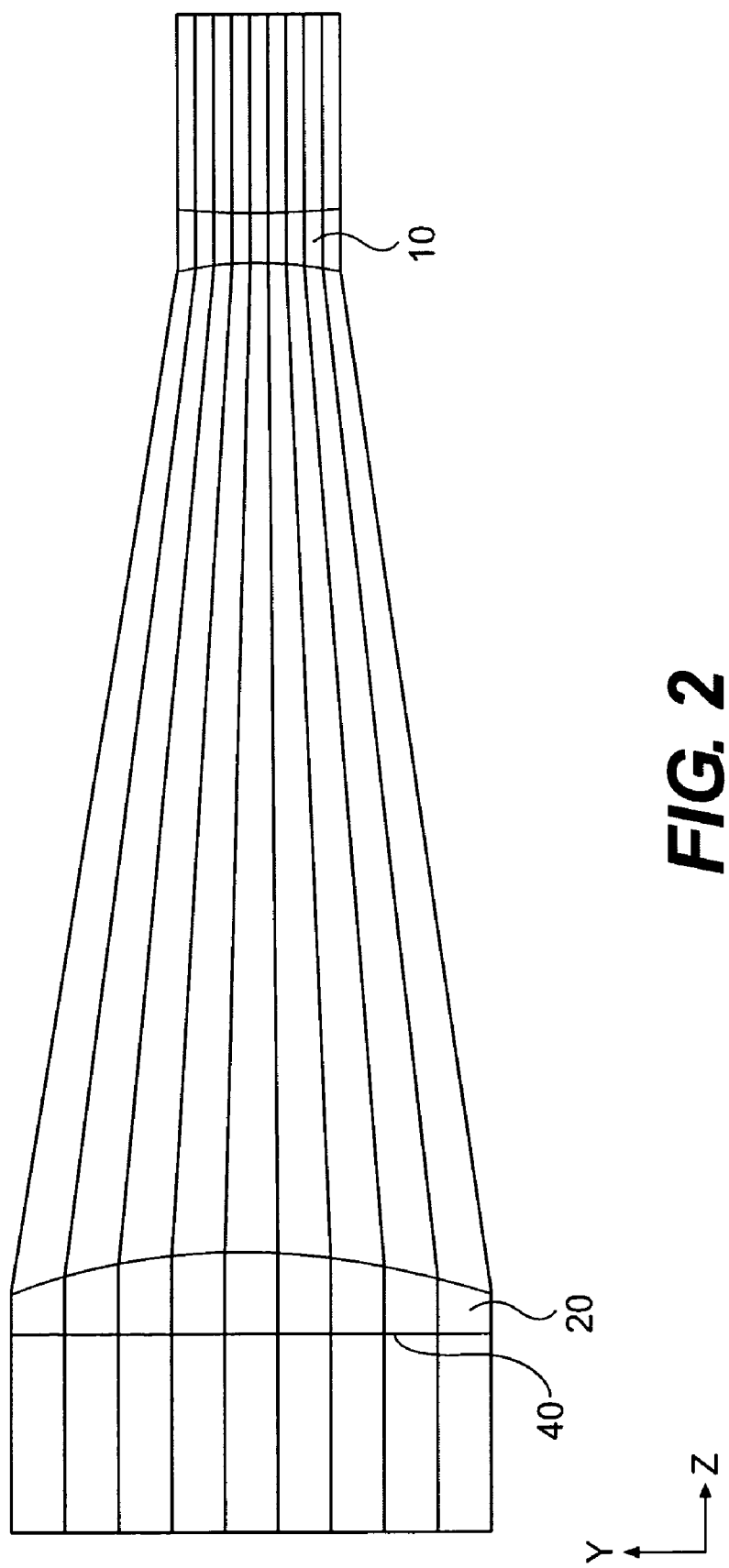
FIG. 2 is another graphical depiction of a beam expander according to the present invention.
Figure 3:
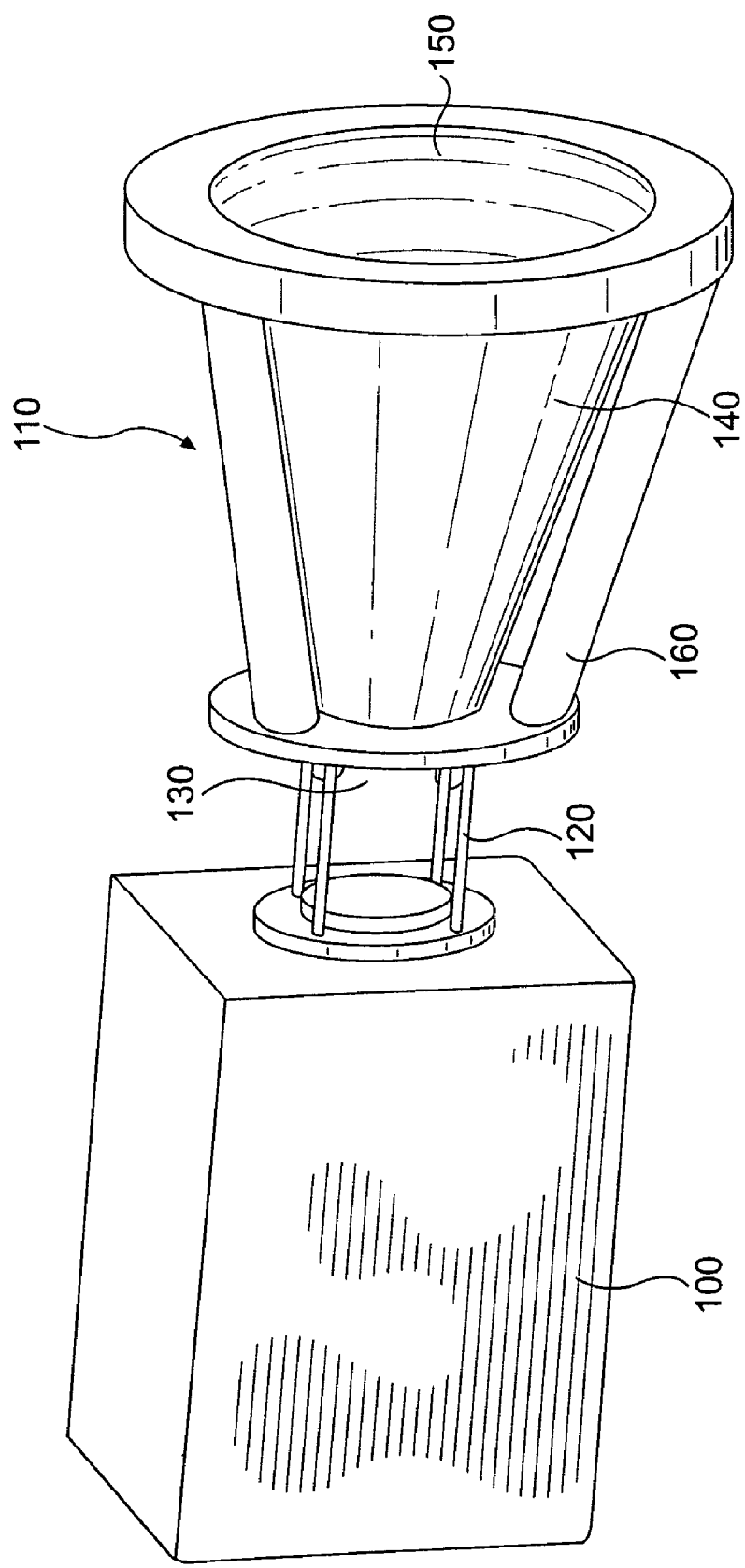
FIG. 3 shows one embodiment of a beam expander according to the present invention when mated up to a commonly used interferometer.

Reference will now be made in detail to the preferred embodiments of the present invention, examples of which are illustrated in the accompanying drawings. FIG. 1 is an embodiment of the external beam expander with a doublet input lens and an output lens. FIG. 2 is an embodiment of the external beam expander with a single input lens and an output lens. FIG. 3 is an embodiment of the external beam expander attached to an interferometer.

A beam expander according to the present disclosure is an optical system that is refractive in nature and converts a small diameter beam to a larger diameter beam via use of an optical prescription that minimizes space, making it practical to perform large aperture interferometry on an optical bench such that vibration and air turbulence is kept to a minimum. Since the size of a beam expander according to the present disclosure is minimized and since the beam expander is built into a robust frame, existing phase-shifting interferometers can be used in their normal mode of operation with the beam expander with the benefit of having a larger (e.g., a 12 inch) aperture beam to sample larger surfaces. Also advantageously, the final surface of the beam expander is optically flat, which allows the final surface to be used as a reference surface in a Fizeau interferometer.

I. Structure of the Beam Expander

As used herein, the term "external" refers to a beam expander according to the invention that is located externally to the interferometer. A beam expander according to the present invention without limitations can be used for any beam of light regardless of whether the beam of light is internal or external to a device such as, e.g., an interferometer.

A beam expander according to the present invention comprises at least one input lens 10 and at least one output lens 20. A housing 30 may connect the input lens 10 and output lens 20.

A. Input Lens and Output Lens

The output lens 20 has a plano-convex arrangement such that the final surface of the output lens is optically flat and can be used as the reference surface in a Fizeau interferometer. Input lens 10 expands the beam of light and output lens 20 functions as a collimating lens.

Input lens 10 may consist of a doublet lens having all spherical radius of curvature (as shown in FIG. 1). Alternatively, input lens 10 may be a single lens with one aspheric surface (as shown in FIG. 2). In one embodiment, input lens 10 may be modified to achieve a cemented doublet lens where the mating lens surfaces have the same radius of curvature for cementing. Alternatively, the doublet lens may be in an air-spaced doublet lens configuration. The air-spaced doublet lens configuration advantageously allows an added degree of aberration control to minimize the separation between the input lens and output (collimator) lens. Furthermore, the air space allows the adjacent lens surfaces to have different radii of curvature.

In another embodiment, the input lens may be a single lens with an aspheric surface or a doublet lens with spherical radii of curvature. The single input lens may have one aspheric surface and one plano surface or one aspheric surface and one nearly plano input surface. In an alternate embodiment, the input lens may have a plano-concave arrangement using one aspheric surface.

The size of input lens 10 and output lens 20 depends on the intended use of the beam expander. The crucial properties of input lens 10 and output lens 20 are that in combination an incoming beam is expanded as it passes through the input lens 10 and output lens 20, with output lens 20 acting as a collimating lens. In one embodiment of the invention, the input lens 10 has a diameter of about 4 inches. In an alternate embodiment, the output lens 20 has a diameter of about 12 to about 16 inches. In another embodiment of the invention, the input lens 10 has a diameter of about 4 inches and is in a singlet configuration. In yet another embodiment, the input lens 10 has a diameter of about 4 inches and is in a doublet configuration.

Similarly, the radius of curvature of lens 10 and 20 varies depending on the intended use. For example, for an output lens diameter of about 12 inches, the radius of curvature may range from about 17 to about 36 inches. For any given lens diameter one of ordinary skill in the art can easily determine the suitable radius of curvature.

The distance between input lens 10 and output lens 20 is determined based on the size, radius of curvature of the lens and desired expansion of the beam. Thus, for example, for an input lens with a diameter of about 4 inches and an output lens with a diameter of about 12 to about 16 inches, the separation between the lenses may be from about 14 to about 28 inches.

Thus, in one embodiment, the beam converts a 4-inch diameter collimated beam of light to a 12-inch diameter beam and scalable to 16-inches in diameter. In an alternate embodiment, the collimated beam is converted from about 4 inches in diameter to about 12 to about 16 inches in diameter.

The input lens 10 and output lens 20 are typically made from a robust and durable glass that is readily available such as, e.g., Fused Silica, BK7, or any other suitable glass replacement. Other suitable types of glass include Schott glass or Ohara glass including, but not limited to, F4, FK51. As used herein, the term "glass replacement" encompasses any material other than glass that has similar optical properties as glass and is used in lenses. By changing the glass or glass replacement type of a 12-inch output lens, the radius of curvature of the 4-inch input lens will change in order to maintain an optically flat final output surface on the collimator lens. The glass or glass replacement type used can be varied depending on the size of lens and the radius of curvature of the lens. One of skill in the art will be able to determine what glass or glass replacement is most suitable based on parameters such as, e.g., the desired radius of curvature as and well as the type of test light used.

In an embodiment of the invention, the output lens consists of a plano-convex lens that can conveniently be manufactured with a convenient spherical radius on the convex surface. In another embodiment of the invention, the plano-convex output lens has a diameter of about 12 inches. In another embodiment, the input lens consists of two 4-inch diameter lenses, which utilize glass and convenient radii of curvature. In an alternate embodiment, the input lens consists of a single 4-inch diameter lens utilizing an aspheric surface.

In yet another embodiment of the invention, the beam expander can serve as a stand-alone beam expander whereby a 4-inch diameter beam is expanded to 12-inches in diameter.

In an alternate embodiment, the input lens has a diameter of about 4 inches, the output lens has a diameter of about 12 inches, and the optical separation between the input lens and output lens is about 24 inches. In that embodiment, the radius of curvature of the output lens may be about 24 inches; however, other radii are considered obvious extensions of the art. Furthermore, the 12-inch output may utilize a robust fused silica substrate or BK7 as lower cost alternatives.

In another embodiment of the invention, the input lens 10 has a diameter of about 4 inches in a cemented doublet lens where the mating lens surfaces have the same radius of curvature for cementing or an air gap in an air-spaced doublet lens configuration. In an alternate embodiment, the output lens has a plano-convex prescription with a radius of curvature from about 17 inches to about 36 inches.

B. Housing

Housing 30 may advantageously be rigid. In one embodiment of the invention, input lens 10 and output lens 20 are located each at opposing ends of housing 30. In another embodiment of the invention, the rigid mechanical housing holds the lens assembly consisting of input lens 10 and output lens 20 and incorporates alignment adjustment means of the assembly such that the final reference surface can be aligned perpendicular to the axis of the interferometer. In an alternate embodiment, invar steel or any other low expansion material such as, e.g., Ultra Low Expansion (ULE) glass bars are used to connect the input lens 10 and output lens 20 to advantageously maintain precise spacing in different temperature environments.

II. Properties of the Beam Expander

The final surface of the beam expander is optically flat and can be polished to a flatness of one-tenth of the wavelength of the test light as, e.g., 63.28 nm peak-to-valley (PV) (or flatter) for a Helium-Neon laser. One of skill in the art can achieve this precision flatness by commonly used techniques such as, e.g., continuous polishing machines.

The optical configuration of a beam expander according to the present disclosure is compact such that the beam expander can be interfaced with existing interferometers such as, e.g., existing 4-inch beam size interferometer. The size of a beam expander according to the present disclosure is minimized and built into an optical frame that enable phase-shifting to be performed using conventional techniques built into the interferometer.

III. Coatings

The beam expander may further comprise an anti-reflective coating on each optical surface of input lens 10 and output lens 20. In one embodiment of the invention, each optical surface is coated with high efficiency anti-reflection coating reducing surface reflections to less than 0.05% reflectivity.

Suitable anti-reflective coatings are known in the art of lens manufacture, including such commercially available coatings as Melles Griot HEBBAR™ (high-efficiency broadband anti-reflection) coatings. The high efficiency anti-reflection coatings preferably reduces the surface reflection from about 4% to less than about 0.1% and as low as 0.01% for a single wavelength.

The final surface 40 of output lens 20, i.e., the surface of output lens 20 that faces to the outside, may be coated with a partially reflective coating and thus serve as the reference surface for the interferometer similar to conventional transmission flats. When the final surface of output lens 20 is coated with such a partial reflective coating, a portion of the incident light is reflected and used as the reference beam in the interferometer while the transmitted beam serves as the test beam of the interferometer. When the final surface of the beam expander is coated with a highly reflective coating, light is reflected back to the interferometer. It is important that reference and test beams have similar strength; otherwise, the contrast of the resulting interference fringes will be low. The partial coating allows one to optimally set the ratio or strength between the two beams.

Suitable partially anti-reflective coatings are also known in the art of lens manufacture, including such commercially available coatings such as, e.g., Sinoceramics Partial Reflective Coating (Part No.: PR).

IV. Types of Light Sources

A beam expander according to the present disclosure can be used with a variety of test light sources, particularly those used in interferometry. For example, the test light source may be Helium Neon lasers, Argon laser, dye laser, laser diodes, Krypton laser, YAG laser, YLF laser, or any laser source having a wavelength within the range of transmission of the glass types. Other test light sources include light sources in the ultra-violet range, such as, e.g., an Excimer laser, or in the infrared, such as, e.g., a carbon dioxide laser, using different glass types for the beam expander lenses.

In one embodiment of the invention, the beam expander is used with an infrared light source. This embodiment is particularly suitable for measurements of rougher or coarser surfaces particularly in fields such as surface metrology applications.

V. Exemplary Applications

A beam expander according to the present invention allows existing phase-shifting interferometers to be used in their normal mode and thus has many applications. A beam expander according to the present invention also has applications beyond the field of interferometry. Exemplary commercial applications include, but are not limited to, optical metrology of large aperture planar optical surfaces, testing adaptive optical components, laser beam steering mirrors, telescope fold mirrors, laser beam projection and laser guide star beam expander. The beam expander can also be used as a laser transmitter and or laser receiver, compound laser transceiver for laser communications, laser beam projection for spectroscopy, and the likes.

FIG. 3 shows one embodiment of a beam expander according to the invention mated up to a commonly used interferometer. Interferometer 100 is shown on the left and beam expander 110 is shown on the right. The components of the beam expander 110 are input lens 130, housing 140, and output lens 150. Connector 120 mates the beam expander 110 to the interferometer 100. Housing 140 has input lens 130 mounted on one end and output lens 150 on the other end. The housing 140 contains invar rods 160, which advantageously maintain precise spacing in different temperature environments. The final optical surface of output lens 150 has plano-concave arrangement such that the surface is optically flat.

Figure 4:
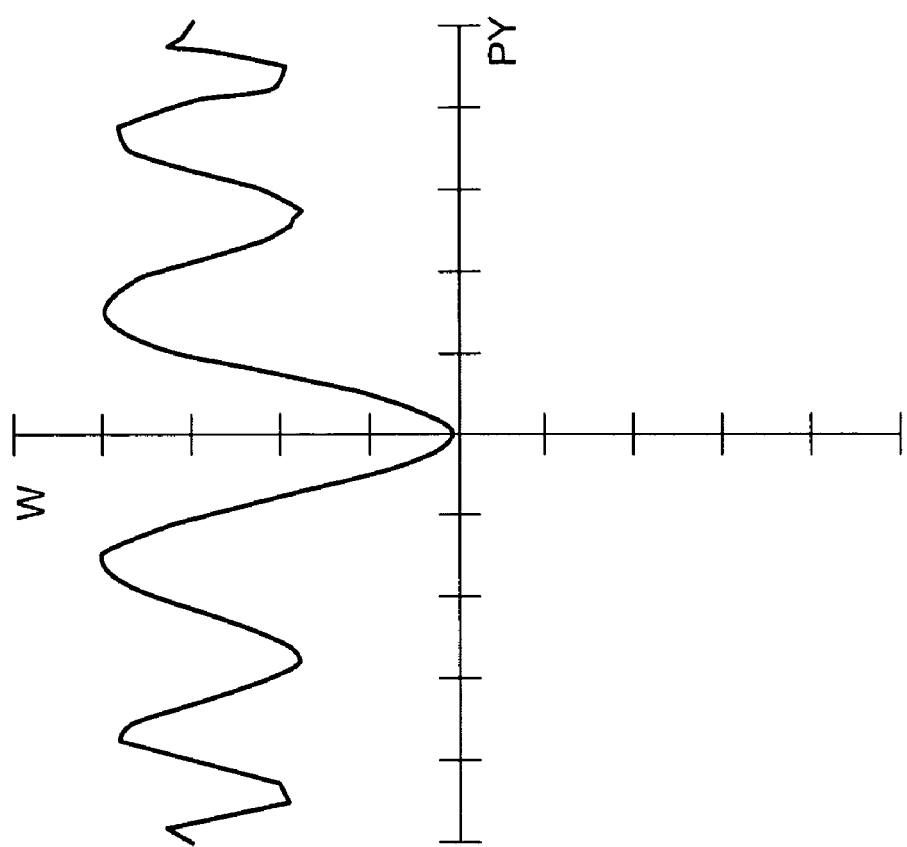
FIG. 4 is a graphical depiction of the optical path difference of light reflecting off the reference surface.

In one embodiment of the invention, the total residual optical aberrations introduced to the incident beam, achieved by the optical design, is less than one twentieth of the wavelength of light (1/20th wave) peak-to-valley (P-V), such as, e.g., 0.03164 microns PV for a Helium-Neon laser (as seen in FIG. 4). This enables a very high precision interferometric metrology to be performed over large surfaces up to 12 to 16 inches in diameter.

In another embodiment, the beam expander is used with 4-inch diameter Fizeau interferometer such as "Zygo" and "Wyko." This enables larger aperture interferometry to be performed utilizing these existing systems.

VI. Methods of Using the Beam Expander

The invention also encompasses methods of using the beam expander. For example, the a beam expander may be used with a phase-shifting interferometer by a) placing a beam expander in line with a phase-shifting interferometer, so that the light exiting the interferometer passes through the beam expander; and b) operating the phase-shifting interferometer with the beam expander.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An external beam expander for use with an interferometer comprising:
   at least one input lens;
   at least one output lens; and
   a rigid housing;
   wherein said input lens is mounted at one end of the housing and said output lens is mounted on the other end of the housing, and
   wherein said at least one output lens has a plano-convex arrangement such that the surface of the output lens is optically flat and can be used as the reference surface in a Fizeau interferometer.

2. The external beam expander of claim 1, wherein said at least one input lens is either a single lens with one aspheric surface or a doublet lens with spherical radii of curvature.

3. The external beam expander of claim 1, wherein the input lens and output lens are separated between about 14 and about 28 inches.

4. The external beam expander of claim 1, wherein the input lens has a diameter of about 4 inches.

5. The external beam expander of claim 1, wherein said output lens has a diameter of about 12 to about 16 inches.

6. The external beam expander of claim 5, wherein said output lens has a diameter of about 12 inches and a radius of curvature of approximately about 24 inches.

7. The external beam expander of claim 1, wherein the final output surface is optically flat to a thickness of one-tenth the wavelength of test light.

8. The external beam expander of claim 1, wherein the plano-convex prescription of the output lens has a radius of curvature from about 17 inches to about 36 inches.

9. The external beam expander of claim 1, wherein the at least one input lens and at least one output lens comprise fused silica or BK7.

10. The external beam expander of claim 1, wherein the surface of the output lens comprises a partially reflective coating.

11. The external beam expander of claim 1, wherein each optical surface is coated with high efficiency anti-reflective coating.

12. The external beam expander of claim 1, wherein said rigid mechanical housing comprises invar steel or any other low expansion material.

13. A method of using a beam expander with a phase-shifting interferometer comprising:
   a) placing a beam expander of claim 1 in line with a phase-shifting interferometer, so that the light exiting the interferometer passes-through the beam expander; and
   b) operating the phase-shifting interferometer with the beam expander.

14. A method of using a beam expander with a phase-shifting interferometer comprising:
   a) providing a phase-shifting interferometer;
   b) providing a beam expander of claim 1; and
   c) placing said beam expander in line with the phase shifting interferometer.

15. A beam expander comprising:
   at least one input lens; and
   at least one output lens;
   wherein said output lens has a plano-convex prescription such that the surface of the output lens is optically flat and can be used as the reference surface in a Fizeau interferometer.

16. The beam expander of claim 15, wherein said input lens is either a single lens with one aspheric surface or a doublet lens with spherical radii of curvature.

17. The beam expander of claim 15, wherein the final output surface is optically flat to one-tenth the wavelength of test light.

18. The beam expander of claim 15, wherein the final surface is coated with partially reflective coating.

19. The beam expander of claim 15, wherein each optical surface is coated with high efficiency anti-reflective coating.

* * * * *